United States Patent [19]
Poole et al.

[11] Patent Number: 5,411,566
[45] Date of Patent: May 2, 1995

[54] OPTICAL FIBER SPATIAL MODE CONVERTER USING PERIODIC CORE DEFORMATION

[75] Inventors: Craig D. Poole, Ocean; Herman M. Presby, Highland Park, both of N.J.

[73] Assignee: AT&T Corp., Murray Hill, N.J.

[21] Appl. No.: 255,685

[22] Filed: Jun. 8, 1994

[51] Int. Cl.⁶ ............................................. C03B 23/20
[52] U.S. Cl. ........................................ 65/402; 65/403; 65/433; 65/385; 385/28; 385/30
[58] Field of Search ........................ 385/28, 27, 29, 30, 385/123, 147, 43, 37; 83/913; 156/625, DIG. 111; 219/121.36; 65/402, 433, 429, 392, 61, 102, 104, 403, 385, 504

[56] References Cited

U.S. PATENT DOCUMENTS

| | | | |
|---|---|---|---|
| 3,969,016 | 7/1976 | Kaiser et al. | 385/28 |
| 4,710,605 | 12/1987 | Presby | 219/121.69 |
| 4,846,547 | 7/1989 | Falco et al. | 385/28 |
| 5,058,979 | 10/1991 | Yamauchi et al. | 385/43 X |
| 5,261,016 | 11/1993 | Poole | 385/28 |

OTHER PUBLICATIONS

Fiber–Optic Modal Coupler Using Periodic Microbending by J. N. Blake et al., Optic Letters, Mar. 1986, vol. 11, pp. 177–179.

Intermodal Coupler Using Permanently Photoinduced Grating in Two-Mode Optical Fiber by H. G. Park et al., Electronic Letters, Jun. 8, 1989, vol. 25, pp. 797–799.

*Primary Examiner*—Rodney B. Bovernick
*Assistant Examiner*—Phan Thi Heartney

[57] ABSTRACT

Efficient conversion between the $LP_{01}$ and the $LP_{11}$ modes in a two-mode optical fiber is realized in a fiber grating fabricated by forming a series of longitudinally-spaced cuts in the fiber cladding, and then annealing the fiber in the region of the cuts. The latter step uses the surface tension of the molten glass to transform the corrugation on the cladding into a sinusoidal deformation of the fiber core.

8 Claims, 3 Drawing Sheets

5,411,566

OPTICAL FIBER SPATIAL MODE CONVERTER USING PERIODIC CORE DEFORMATION

FIELD OF THE INVENTION

This invention relates to spatial mode converters and, in particular, to a method of inducing mode conversion in an optical fiber by means of periodic deformation of the fiber core.

BACKGROUND OF THE INVENTION

The ability to convert optical energy efficiently from one spatial mode to another has potential applications in optical fiber-based devices such as wavelength filters, sensors, and dispersion compensators. A variety of grating-based mode converters have been demonstrated using periodic stress, microbending, and photo-induced index changes. (See, for example, "Fiber-optic modal coupler using periodic microbending", by J. N. Blake et al., Optics Letters, March 1986, Vol. 11, pp. 177–179.)

The first two of these techniques have the potential for high conversion efficiency and low insertion loss, but suffer from poor long-term reliability. Mode converters based on photo-induced index gratings promise both high reliability and performance and, thus, have been the focus of research in recent years. (See "Intermodal coupler using permanently photoinduced grating in two-mode optical fiber", by H. G. Park et al., Electronics Letters, Jun. 8, 1989, Vol. 25, pp. 797–799.)

SUMMARY OF THE INVENTION

The present invention is an alternative method for producing periodic coupling between spatial modes in an optical fiber. The process comprises two steps. In the first step, a series of longitudinally spaced cuts is made in the cladding of the glass fiber. The next step in the process involves annealing the fiber. The latter step uses the surface tension of the molten glass to transform the corrugation on the cladding surface into a permanent sinusoidal deformation of the fiber core.

The above-described technique produces highly efficient, permanent, and reliable gratings. In addition, extremely large bandwidth gratings can be obtained. This is because the effective index changes produced by deforming the core, i.e., $\Delta n \approx 0.1$, are approximately an order of magnitude greater than the largest permanent index changes achieved in photo-induced gratings. This feature is clearly important for applications requiring mode conversion over a large bandwidth.

DETAILED DESCRIPTION

Figure 1:
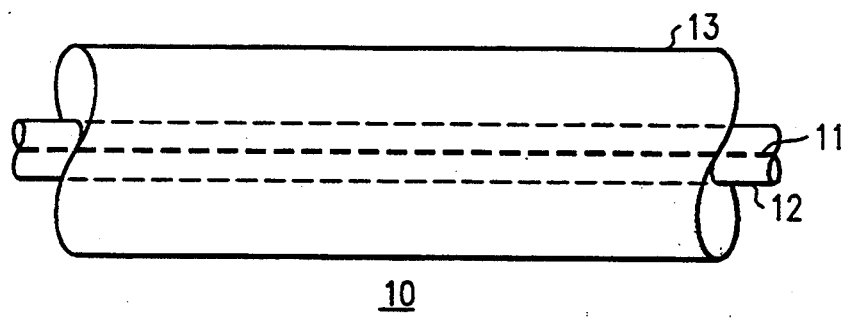
FIG. 1 shows a typical optical fiber comprising an inner core region surrounded by an outer cladding and a protective jacket.

Referring to the drawings, FIG. 1 shows a typical optical fiber 10 comprising an inner core region 11 surrounded by an outer cladding 12. The fiber is advantageously protected by means of a surrounding outer jacket 13.

In a well-produced fiber, there will be little coupling among the various modes supported by the fiber. However, as noted hereinabove, there are situations wherein coupling from one spatial mode to another has potential applications in fiber-based devices. The present invention relates to a two-step method of converting a length of optical fiber into an efficient mode converter.

Figure 2:
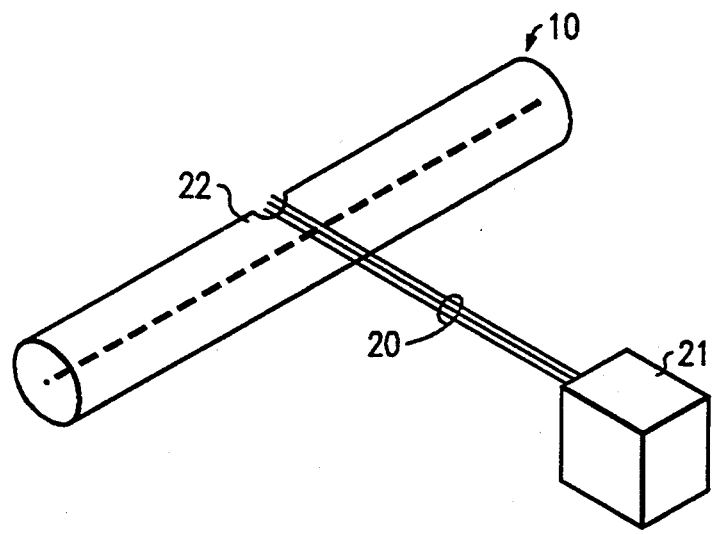
FIG. 2 shows the cladding of a fiber, of the type illustrated in FIG. 1, being exposed to the focused output of a laser.

In the first step, periodic cuts are made in the outer surface of the cladding. This can be done in a variety of ways. For example, the cladding can be mechanically abraded. Alternatively, a chemical etching process can be employed. For purposes of illustration, periodic cuts are made along the surface of the fiber cladding where the protective jacket has been removed, using a focused $CO_2$ laser beam in the manner described in U.S. Pat. No. 4,710,605 issued Dec. 1, 1987 and assigned to applicants' assignee. This is illustrated in FIG. 2 which shows the fiber 10 exposed to the focused output beam 20 of a laser 21. The beam is directed onto the fiber cladding 22 in a direction normal to the longitudinal axis of the fiber. The laser is pulsed on and off, thereby selectively vaporizing small amounts of cladding material without damaging the fiber. In an illustrative mode converter made in accordance with the teachings of the present invention, cuts were made with a single laser pulse of 100 watts peak power and of 90 microseconds duration. The spot size of the beam at the fiber surface was $\sim 150$ $\mu m$.

Figure 3:
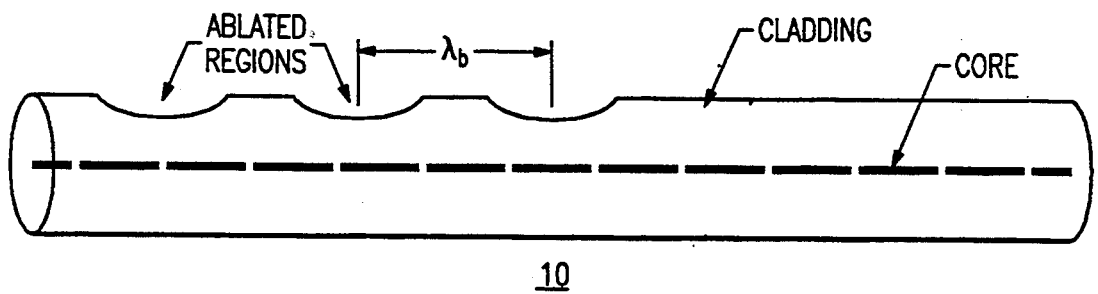
FIG. 3 shows three ablated regions longitudinally spaced along the cladding of a fiber.

After completing each cut, the fiber is translated longitudinally a distance $\lambda_b$ equal to the intermodal beat length for the $LP_{01}$ and $LP_{11}$ modes and the process is repeated to obtain a corrugated pattern along the surface of the fiber cladding, as illustrated in FIG. 3. In this figure, three ablated regions are shown, spaced apart the beat distance $\lambda_b$. For a step-index fiber of $\Delta n \approx 1\%$, and at a wavelength of 1550 nm, $\lambda_b$ is approximately equal to 265 $\mu m$ for the $LP_{01}$ and $LP_{11}$ modes. Typically from 10 to 20 such regions are formed.

Figure 4:
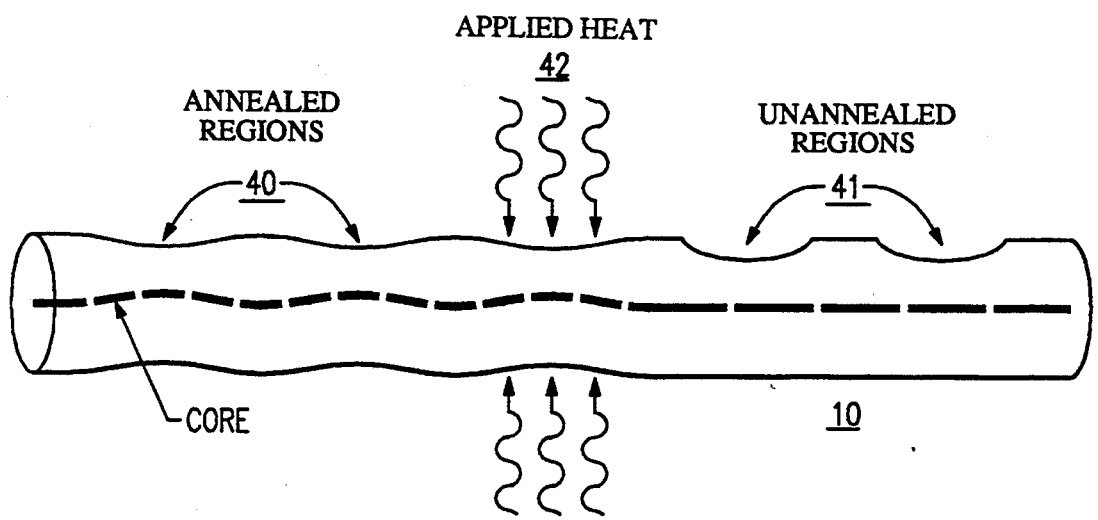
FIG. 4 shows a fiber with two annealed regions, two unannealed regions, and a fifth ablated region in the process of being annealed.

At this point in the process no mode conversion is obtainable since the perturbations created on the surface of the fiber do not extend into the core region. To extend this perturbation into the core requires a second step. In this second step, the fiber is locally heated to its melting point for a short time using, for example, the arc of a fusion splicer. Heat is applied individually to each cut region. The purpose of this annealing process is to use the surface tension of the molten glass to transform the corrugations on the fiber surface into an undulating deformation of the core, as illustrated in FIG. 4. In this figure, two annealed regions 40 and two unannealed regions 41 are shown. A fifth region 42, with heat being applied, is in the process of being annealed. In the annealed regions 40, the core is seen to undulate in a sinusoidal-like manner.

In an illustrative embodiment of the invention, an 11 mA fusion arc current of 0.9 seconds duration was employed to anneal each cut.

Mode conversion can be monitored in real time as the grating is being annealed by measuring transmission of the $LP_{01}$ mode. Mode strippers, for removing the $LP_{11}$ mode, are placed at the input and output ends of the converter. Coupling from the $LP_{01}$ to the $LP_{11}$ mode shows up as a decrease in transmitted power since all of the $LP_{11}$ mode power is removed by the output mode stripper.

Figure 5:
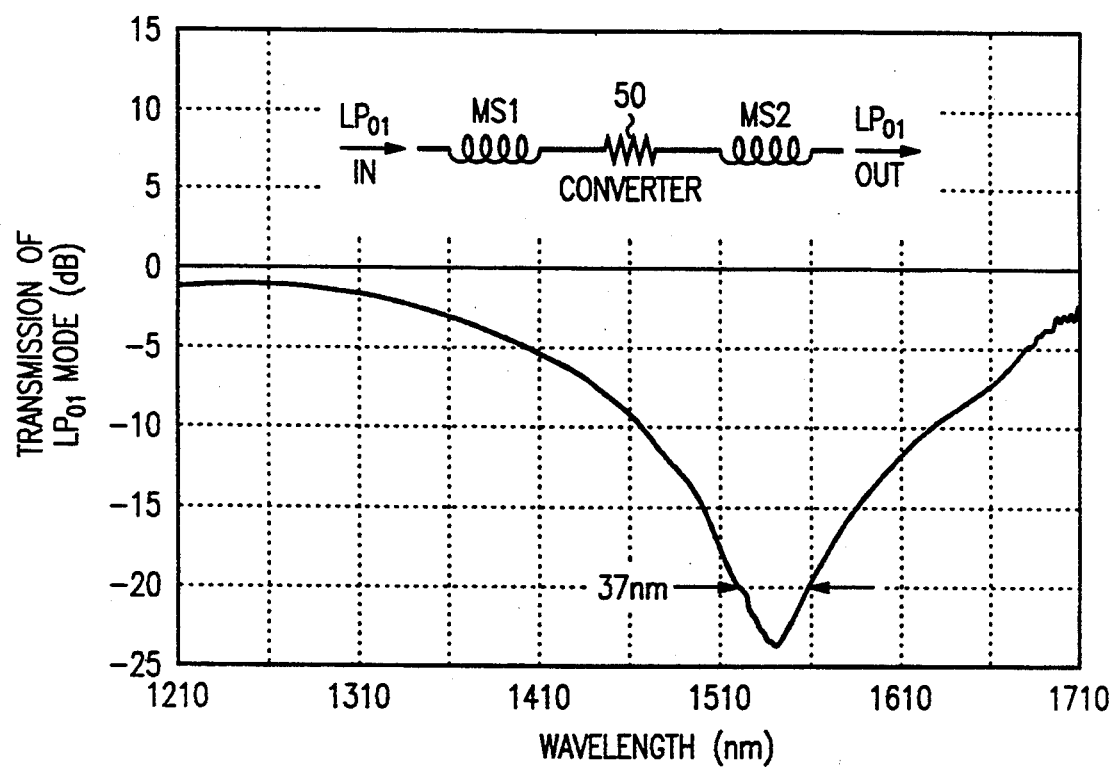
FIG. 5 shows transmission through a mode converter made in accordance with the present invention as a function of wavelength.

FIG. 5 shows transmission through a mode converter made in accordance with the present invention. Mode strippers MS1 and MS2 are located at the input and output ends of the converter 50 to remove the $LP_{11}$ mode. Maximum conversion from the $LP_{01}$ to the $LP_{11}$ mode of 99.6% was obtained at 1540 nm, as shown by the 24 dB dip in the transmission curve. The bandwidth for 99% coupling (−20 dB level in the transmission curve) was 37 nm. These measurements were made for a step-index, germania-doped fiber having an effective step of ~1% and cut-off wavelength for the $LP_{11}$ mode of 1720 nm.

The insertion loss of the device was measured to be 0.38 dB at 1540 nm using an external cavity laser in a cutback measurement. The polarization dependence of the insertion loss was less than 0.1 dB.

The robustness of the packaged mode converter was explored in two ways. First, the sensitivity of the mode conversion efficiency to fiber bending was checked by forming loops of various diameter with sections of fiber containing the converter. A loop of 4 cm diameter was required to drop the mode conversion efficiency from 99.6% to 98% at 1540 nm. The low sensitivity of the converter to bending is attributed to the strength of the perturbation produced by the grating.

A second test involved measuring the tensile strength of the grating. Tests of these gratings showed tensile strengths in excess of 80 kpsi. Breakage occurred in all three cases at locations adjacent to the grating, rather than at the grating itself. This was attributed to the effects of handling the base fiber while processing the grating. Accordingly, to avoid tensile strength reduction, care should be taken when handling the fiber during fabrication.

What is claimed is:

1. A method for introducing a periodic deformation along the core of an optical fiber having a core region surrounded by a cladding comprising the steps of:
   making cuts in said cladding at longitudinally spaced intervals;
   and annealing said fiber in the regions of said cuts.

2. The method according to claim 1 wherein said cuts are made by mechanical abrasion.

3. The method according to claim 1 wherein said cuts are made by chemical etching.

4. The method according to claim 1 wherein said cuts are made by means of a focused laser beam.

5. A product made in accordance with the method of claim 1.

6. A method for fabricating a mode converter in an optical fiber having an inner core surrounded by an outer cladding comprising the steps of:
   making cuts in said cladding at longitudinally spaced intervals $\lambda_b$;
   and annealing said fiber in the regions of said cuts thereby permanently deforming said core.

7. The method according to claim 6 wherein said converter converts wave energy from the $LP_{01}$ mode to the $LP_{11}$ mode.

8. The method according to claim 7 wherein $\lambda_b$ is equal to the intermodal beat length for the $LP_{01}$ and $LP_{11}$ modes.

* * * * *